March 26, 1963 J. F. GRADO 3,082,635

PHONOGRAPH TURNTABLE

Filed Sept. 15, 1961 3 Sheets-Sheet 1

INVENTOR.

JOSEPH GRADO

BY Amster & Levy

ATTORNEYS

March 26, 1963 J. F. GRADO 3,082,635

PHONOGRAPH TURNTABLE

Filed Sept. 15, 1961

3 Sheets-Sheet 2

INVENTOR.
JOSEPH GRADO

BY Amster & Levy

ATTORNEYS

March 26, 1963 J. F. GRADO 3,082,635

PHONOGRAPH TURNTABLE

Filed Sept. 15, 1961 3 Sheets-Sheet 3

INVENTOR.
JOSEPH GRADO

BY Amster & Levy

ATTORNEYS

United States Patent Office 3,082,635

Patented Mar. 26, 1963

3,082,635
PHONOGRAPH TURNTABLE

Joseph F. Grado, 641 46th St., Brooklyn 20, N.Y.

Filed Sept. 15, 1961, Ser. No. 138,508
16 Claims. (Cl. 74—216.5)

The present invention relates generally to high fidelity audio equipment and specifically to an improved phonograph turntable and mounting means therefor.

With the advent of modern high fidelity audio equipment and specifically with the improvement of phonograph pickup cartridge characteristics, a demand has been increasingly felt for a phonograph turntable having performance characteristics which are equal to those demonstrated by other pieces of audio equipment. Specifically, it has been found that heretofore known turntable constructions, while outwardly appearing capable of rotating a phonograph record about its central axis at a desired number of revolutions per minute, actually produced many random mechanical movements in a phonograph record resting on the turntable which were picked up by the pickup cartridge and eventually amplified by the audio system. This situation was made more acute with the introduction of stereophonic pickup cartridges due to the multi planar movement of a stereo pickup stylus. In conventional pickup cartridges adapted for reproducing monophonic phonograph records, the only significant signal producing movement for the stylus is in a direction parallel to the plane of the phonograph. However, in stereophonic pickup cartridges movement in one plane produces a signal in one channel of the audio system while movement in a second produces a signal in the other channel of the audio system. Current constructions of both phonograph records and pickup cartridges place these planes of movement at 45° to the plane of the phonograph record. Thus, any movement either perpendicular to or parallel to the plane of the phonograph record will produce a signal in one or both of the channels of the stereophonic audio system. Due to the multi directional signal producing characteristics of modern stereophonic pickup cartridges, the demand for a high quality and high performance phonograph turntable at a reasonable production price has markedly increased.

The requirements for such a turntable are that it transports records through a revolution about their central axis at a predetermined number of revolutions per second, e.g. at 16, 33⅓, 45 or 78 revolutions per minute that it does so with virtually no fluctuation in the rate of revolution and that no random movements of the surface of the record are introduced. It is desired that the turntable itself rotates smoothly about its own central axis thus insuring no random movement of any point on the turntable which would, and has been the case in the past, introduce an unwanted noise signal in the phonograph pickup. Of course, if a turntable rotates about a line other than its own central axis, as in the case where even a small clearance is allowed between the turntable shaft and its mating bearing, an amplified vertical movement will be produced at the edge of the turntable thus introducing random and unwanted noise.

Accordingly, it is an object of the present invention to provide a turntable construction embodying one or more of the advantageous features recited above. Specifically, it is an object of the present invention to provide an improved turntable construction of high quality wherein wow, flutter and rumble are materially reduced.

It is further within the contemplation of the present invention to provide a phonograph turntable construction of high quality wherein the turntable rotates absolutely about its axis of mounting.

It is still a further object of the present invention to provide a turntable mounting having essentially no clearance in its bearings to eliminate all but pure rotational movement between the turntable and turntable shaft and its bearings.

It is a further object of the invention to utilize the gyroscopic effects of a flywheel mounted between two bearings on a turntable shaft to oppose any motion of the turntable other than pure rotation, and to eliminate any tendency of a shaft and bearing to bind when a flywheel is located outside of a bearing rather than between bearings.

It is further within the contemplation of the present invention to provide a high quality phonograph turntable assembly of design features which do not require the maintenance of extremely fine manufacturing tolerances.

In accordance with the teachings of the present invention there is provided a phonograph turntable assembly comprising a frame within which is mounted a main shaft for rotation about a central axis. At one end the main shaft is provided with a spherical end which is received within an adjustable conical well. Adjacent the other end of the shaft there is provided a self-centering resilient bearing such that the shaft may rotate about its central axis as defined by the center of the spherical surface within the conical well and the center of the self-centering bearing. A flywheel is mounted upon the shaft intermediate the two bearings and a turntable platter is mounted on the shaft at the end thereof opposite from the spherical surface.

Rotational power may be transmitted to the main shaft, flywheel and turntable platter according to the present invention by the provision of an electric motor mounted on the frame and connected to the flywheel by means of a flexible belt positioned about the flywheel and about the drive capstan of the motor. The motor is advantageously hung by means of resilient mounting members from a motor mounting plate which is in turn rigidly secured to the main frame. The connection of the motor to the motor mounting plate is by means of adjustable securement within slots provided in the motor mounting plate such that the distance between the center of the flywheel and the center of the motor capstan may be varied thereby varying the tension in the flexible drive belt. Further, the center line of the drive belt and the motor capstan are positioned substantially in the center of the resilient mounting means to substantially eliminate any pendulum effect resulting from the resilient mounting of the motor.

The above brief description, as well as further objects, features and advantages of the present invention will be best appreciated by reference to the following detailed description of a presently preferred embodiment of the present invention when taken with the accompanying drawings, wherein.

Figure 1:
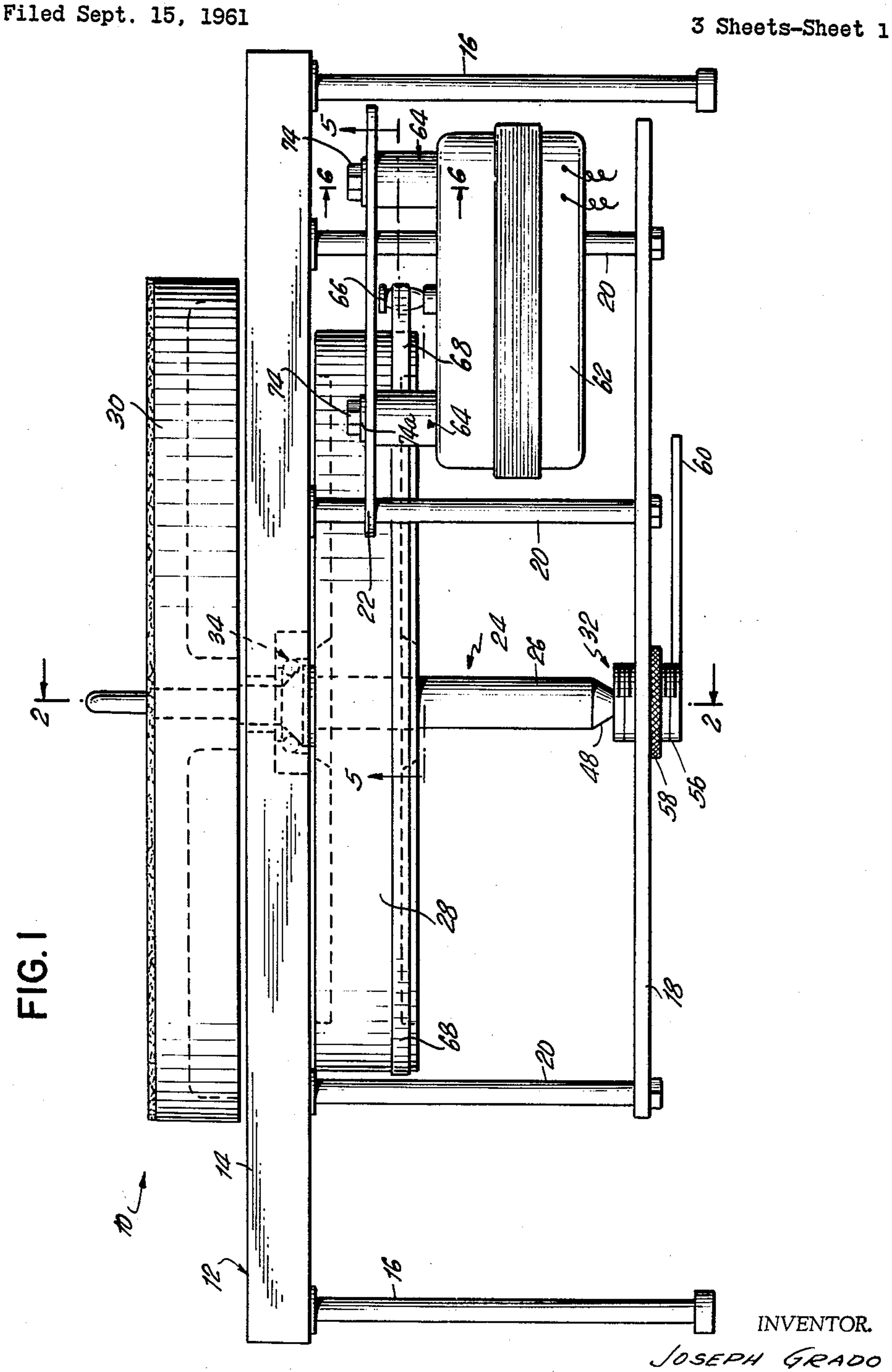
FIG. 1 is a side elevational view of a turntable assembly according to the present invention.

Referring now specifically to the drawings, there is shown a phonograph turntable assembly, generally designated by the numeral 10, which is mounted on a frame 12. The frame 12 includes a base plate 14 which is supported on legs such as shown at 16, a bearing mounting plate 18 which is mounted on the base plate 14 by the support columns 20, and a motor mounting plate 22 supported between the base plate 14 and the bearing plate 18 by two of the support columns 20. Mounted within this framework is the rotating unit 24 which includes a main shaft 26, a flywheel 28 rigidly secured to the shaft 26 by a press fit or otherwise and a turntable platter 30 which is secured at one end of the shaft 26 which is similarly rigidly secured to the shaft 26. The rotating assembly 24 is mounted within the frame 12 for rotation of a first bearing 32 at the end of the shaft 26 opposite from the turntable platter 30 and on a second, self-centering bearing 34 adjacent the other end of the shaft 26 intermediate the turntable platter 30 and the flywheel 28.

Figure 2:
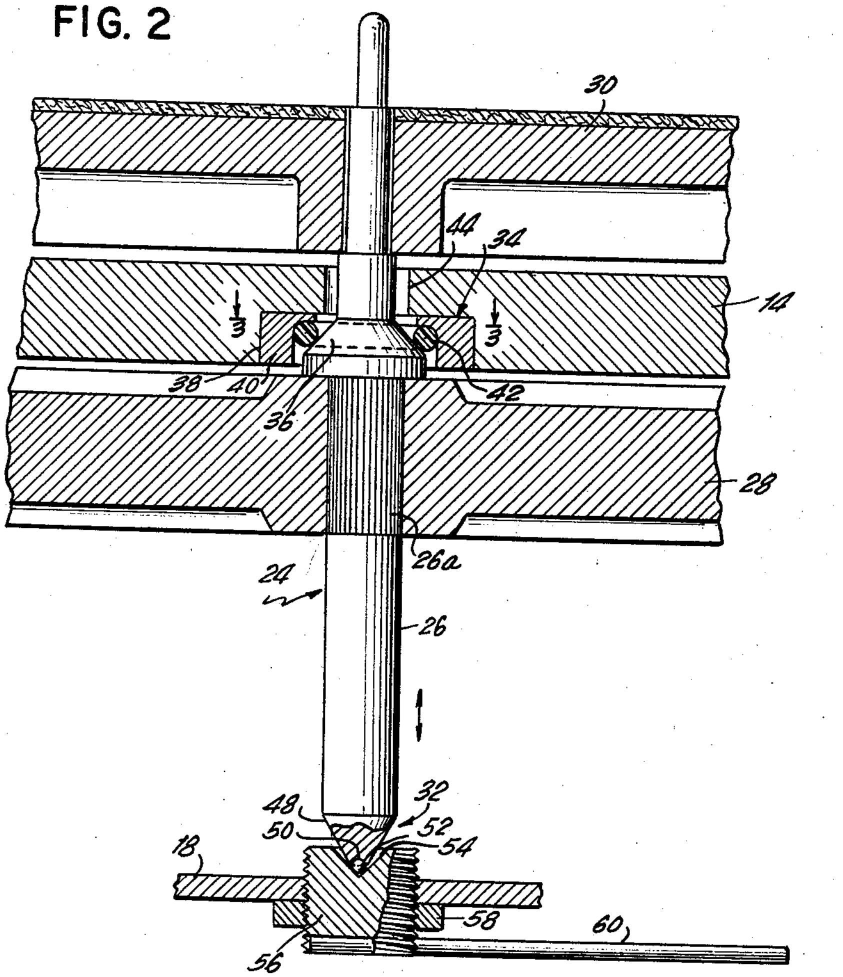
FIG. 2 is a sectional view taken along the line 2—2 of FIG. 1 looking in the direction of the arrows and illustrating the details of the mounting bearings for the turntable.
Figure 3:
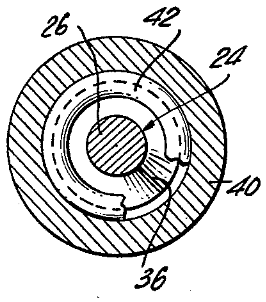
FIG. 3 is a sectional view taken along the line 3—3 of FIG. 2 looking in the direction of the arrows illustrating the upper, self-centering bearing.

Reference will now be made to FIG. 2 for a description of the self-centering bearing 34. Located above the scored portion 26*a* of the shaft 26 (the location of the flywheel 28 on the shaft 26) is a conical section 36 which is integral and coaxial with the main shaft 26. As may be seen in FIG. 2, the conical section 36 is of greater diameter than the shaft 26 and faces upwardly toward the turntable platter 30. Mounted within a bearing-receiving opening 38 formed in the base plate 14 is a bearing housing 40 within which is positioned a bearing member 42 which is in the shape of a toroid. In the present illustrative embodiment, the bearing member 42 is in the form of a circular torus which is securely received within the bearing mount 40. The bearing mount 40 and the bearing member 42 are coaxial with a clearance opening 44 formed in the main plate 14 through which projects the upper portion of the shaft 26. It will be appreciated that upward movement of the shaft 26 is effective to bring the surface of the conical section 36 into engagement with the inner portion of the bearing ring 42 such that a zero clearance condition may exist within the bearing 34. The bearing member 42 may be advantageously manufactured from a low friction but resilient material such as Teflon such that the bearing 34 may be pre-loaded to insure zero clearance between the conical section 36 and the bearing member 42. A pre-loading of the bearing 34 will also introduce the known drag force upon the shaft 26 opposing rotation thereof, the drag being proportional to the relatively low coefficient of friction between the Teflon bearing member 42 and the conical section 36 of the shaft 26 and the normal force between those members. This drag force may be utilized, as stated below to introduce small order speed corrections.

At the end opposite from the bearing 34 is positioned the other shaft bearing 32. This end of the shaft 26 is of generally conical configuration as indicated at 48 in FIG. 2 and terminates at a ball seat 50. A relatively small ball 52, formed of a hard steel or other high strength material, is received within the ball seat 50 and forms a spherical tip on the end of the shaft 26. This spherical shaft tip 52 is received within a conical well 54, of wider angular dimensions than the conical end 48 of the shaft 26, formed in one face of an adjustable bearing plug 56. The plug 56 is threadedly received within the bearing mounting plate 18 such that a rotation of the plug 56 with respect to the plate 18 will move the plug 56 along its central axis. It will be appreciated that the spherical end 52 of the shaft 26 makes essentially a circular line contact with the inside conical surface 54 of the plug 56 and, further, that movement of the plug 56 with respect to the bearing mounting plate 18 toward the main plate 14 will be effective to move the shaft 26 and therefore, the conical section 36 toward the bearing member 42, at first into contact therewith and then to compress the member 42 and to pre-load the bearing 34. Thus, the rotating assembly 24 is mounted for rotation about a line defined by a point at one end of the shaft 26 determined by the seating of the ball end 52 within the conical well 54 and a point at the other end of the shaft 56 determined by the center of the bearing member 42.

It will be appreciated that the above described bearing mounting means for the turntable assembly 10 provides a zero clearance situation insuring rotation of the rotating unit 24 about its own axis. This obviates the prior art difficulties wherein a turntable shaft was received within a bearing well having an elongated U-shaped configuration in cross section. In these prior art structures, there was a marked tendency for small order binding situations to occur wherein the turntable shaft periodically caught and released on the upper corner of the bearing well thereby introducing amplified mechanical disturbances at the edge of the turntable. Furthermore, this prior art mounting system of necessity required a small tolerance clearance between the shaft and the bearing well which introduced an inherent wobble to the turntable with respect to the well and its support frame.

It will be further appreciated that the above described mounting means for the rotating unit 24 produces operating characteristics which are independent of the orientation of the full turntable assembly. Therefore, the turntable assembly 10 may be mounted with the turntable platter 30 in vertical rather than the usual horizontal position thus enabling rack mounting or mounting in a book case.

Figure 4:
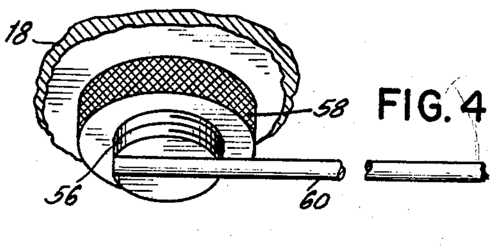
FIG. 4 is a perspective view looking at the bottom of the lower bearing assembly.

As may be seen in FIG. 4, a knurled lock nut 58 is provided to lock the bearing plug 56 in position with the bearing mounting plate 18. An adjustment rod 60 is fitted into a complementary slot formed transversely in the bearing plug 56 to provide simple means to adjust the axial location of the plug 56 with respect to the bearing mounting plate 18. In practice, the kurled nut 58 is loosened and the adjustment arm 60 is rotated in order to raise the shaft 56 toward the bearing 34 thereby to eliminate any clearance between the conical sections 36 and the bearing member 42 and then, to selectively preload the bearing 34 to the desired degree. With the introduction of rotating power to the rotating assembly 24, as by a flexible belt to the flywheel 28 as will be described below, it will be appreciated that a measure of highly accurate speed control may be achieved by varying the pre-loading of the bearing 34. By use of a stroboscopic indicator, highly selective speed adjustments may be made by the simple axial adjustment of the position of the bearing plug 56.

Figures 5, 6, 7:
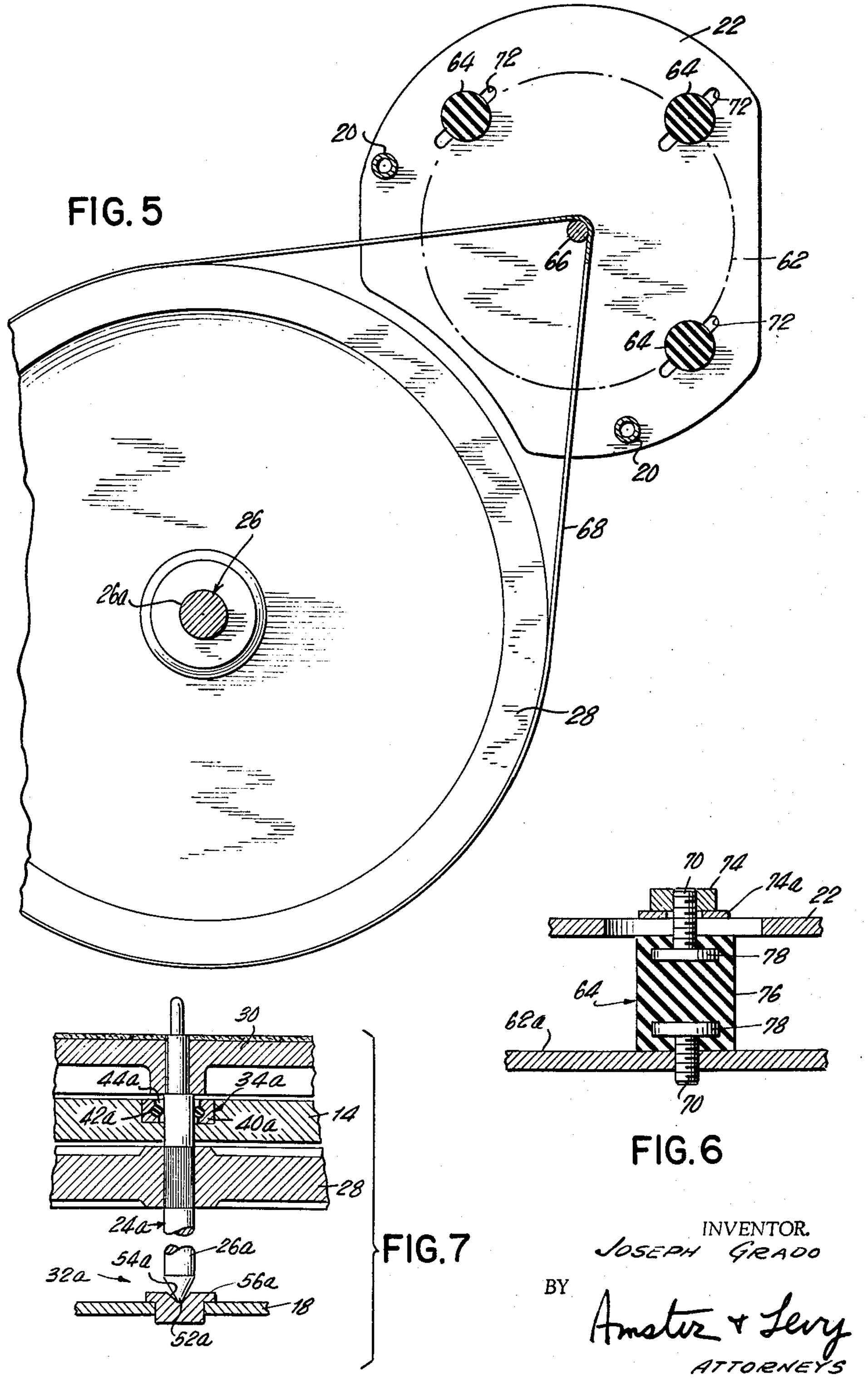
FIG. 5 is a sectional view taken along the line 5—5 of FIG. 1 looking in the direction of the arrows and illustrating the mounting means for the motor.
FIG. 6 is an enlarged sectional view taken along the line 6—6 of FIG. 1 looking in the direction of the arrows illustrating the construction of the resilient motor mounting members.
FIG. 7 is a sectional view, similar to FIG. 2, illustrating a segment of a turntable mounting assembly of a slightly different design incorporating features of the present invention.

In FIG. 7 a modification of the bearing mounting means of FIG. 2 is illustrated which provides many of the same advantageous features. In the assembly of FIG. 7, a bearing well 56*a* is secured to the bearing mounting plate 18 by any suitable means, such as by the integral mounting shoulder illustrated in FIG. 7. The bearing well 56*a* has a conical portion 54*a* which receives the lower portion of a shaft 26*a*. The lower portion of the shaft 26*a* is generally of conical configuration and has a ball tip 52*a* at its lower end. The shaft 26*a* forms the basic portion of a rotating assembly 24*a* which includes the rigidly secured flywheel 28 and the turntable platter 30. The rotating assembly 24*a* is secured at a further bearing 34*a* to the main plate 14 on the opposite side of the flywheel 28 from the bearing 32*a*. The bearing 34*a* may be of any well known high quality low clearance bearing and is illustrated in FIG. 7 as comprising an annular member 42*a* constructed of material such as Teflon received within a bearing mount 40*a* formed with appropriate seating means as shown. The mount 40*a* is received within the main plate 14 at the clearance opening 44*a*.

It will be appreciated that weight of the rotating assembly 24*a* is sufficient to produce firm interengagement of the ball tip $52a$ with the bearing member 56 and that the Teflon ring $42a$ provides a bearing, in association with the cylindrical surface of the shaft $26a$ to form a second bearing. The flywheel 28 is positioned between these two bearings to thereby produce the advantageous, substantially on-axis rotation which is effective to produce a turntable assembly having extremely low wow, rumble and flutter.

Reference will now be made to FIGS. 1, 5 and 6 for a description of a presently preferred drive means to introduce rotational power to the rotating assembly 24. The motor mounting plate 22 is supported on the frame 12 at substantially the level of the flywheel 28 by rigid securement to two of the support columns 20. A drive motor 62 is mounted on the plate 22 by means of three flexible shock mounts 64 with the drive shaft and capstan 66 of the motor facing upwardly with its drive portion intersecting a plane just above the lower level of the flywheel 28. A flexible drive belt 68 is positioned about the outer surface of the flywheel 28 and about the curved face of the capstan 66 such that rotation of the capstan 66 is effective to rotate the flywheel 28, the shaft 26 and, therefore, the turntable platter 30. The diameters of the flywheel 28 and the motor capstan 66 are such that the motor 62 drives the rotating assembly 24 at a preselected speed, such as 33⅓ revolutions per minute. Advantageously, the diametral ratios between the flywheel 28 and the capstan 66 may be designed to produce a speed very slightly higher than that desired providing room for manipulation of the adjustment features of the bearings 32, 34 to compensate for manufacturing tolerances in the turntable assembly 10 and the motor 62.

It will be noted by examining FIG. 1 that the point of contact of the flexible drive belt 68 with the capstan 66 is substantially in the middle of the shock mounts 64 such that the normally encountered pendulum effect is substantially reduced or eliminated. Since the force exerted upon the motor in the direction of the shaft 26 occurs substantially in the plane of mounting of the motor 62, very little, if any, swinging effect results.

As seen in FIG. 5, the shock mounts 64 are secured to the motor mounting plate 22 by means of threaded studs 70 which project upwardly from the shock mounts 64 and are received within three parallel slots 72 formed within the motor mount plate 22. Nuts 74 and washers $74a$ are provided on the studs 70. It will be appreciated that by loosening the nuts 74 and sliding the motor within the slots 72, the tension and the flexible drive belt 68 may be selectively varied. As seen in FIG. 6 the shock mounts 64 may comprise a rubber section 76 which receives at its upper end the threaded stud 70 having an anchoring head 78 and a similar stud 70 and anchoring head 78 at its lower end. The lower stud 70 is fixed to the motor casing $64a$ while the upper stud 70 provides the means for securement, with the nut 74, to the motor mounting plate 22.

Power is transmitted from the motor 62 through the flexible belt 68 to the flywheel 28, then to the shaft 26 upwardly through the bearing 34 and finally to the turntable platter 30. This relatively long chain of power transmission, through bodies of relatively large mass, provides multiple filtering of mechanical vibrations by use of the various component structures of the mechanisms without requiring the addition of any external filtering elements. This, in combination with the true, on-axis rotation of the rotating unit 24, provides marked decrease in undesirable wow, rumble and flutter. Of course, it will be appreciated that other means may be employed to introduce power into the rotating assembly 24, such as by means of a direct motor connection to the shaft 26 by the well known and customarily employed mechanical connection of a motor drive to the turntable platter 30 or by any one of the other systems known in the art.

It will be appreciated that there is provided in accordance with the present invention a turntable assembly having markedly improved performance characteristics. The use of a flywheel mounted between bearings produces a true gyroscopic effect which is unavailable when a flywheel is mounted on one side of a single bearing. Further, the point mounting of one end of the turntable shaft and the self-centering and zero clearance bearing provided at the other end insures one hundred percent on-axis rotation thus eliminating the wobble and rumble which normally would be found in a turntable bearing having even the smallest possible clearances. Still further, by the use of the bearing means provided according to the present invention a selective speed control is provided which allows the introduction of a selective amount of drag, thereby providing a fine adjustment speed control for the turntable assembly.

The invention described herein may be practiced by the employment of physical structures which are not identical but which are analogous to those shown in the drawings. For example, it is well known that a shaft may rotate within a sleeve or, alternatively, a sleeve may rotate about a shaft. In both situations, the same relative motion is obtained. Similarly, in the present case rather than having the shaft 26 rotate within the frame, a shaft may be rigidly fixed to the frame and a sleeve may be positioned, with clearance, about the stationary shaft. At one end a zero clearance bearing may be provided between the two members and a second zero clearance bearing may be provided at or adjacent the other end. A mass acting as a flywheel may then be mounted upon the sleeve intermediate the two bearing means and the turntable platter may be secured thereabove. Such an embodiment of the present invention would merely be an inside-out arrangement above the device illustrated in the accompanying drawings. This and other physical arrangement of the present invention will occur to mechanics skilled in the art.

Thus, the foregoing disclosure contains an intended latitude of modification, change and substitution and in some instances some features of the invention would be employed without a corresponding use of other features. Accordingly, it is appropriate that the appended claims be construed broadly and in a manner consistent with the spirit and scope of the present invention.

What I claim is:

1. A phonograph turntable mounting assembly comprising a frame, a main shaft, bearing means mounted in said frame for supporting one end of said shaft, said bearing means being longitudinally movable within said frame for longitudinally moving said shaft, further bearing means spaced from the other end of said shaft including a bearing ring mounted within said frame and a conical bearing surface on said shaft engaged against said bearing ring, a flywheel rigidly mounted on said shaft between said bearing means, and a turntable rigidly mounted on said shaft at said other end.

2. A phonograph turntable mounting assembly comprising a frame, a main shaft, bearing means mounted in said frame for supporting one end of said shaft for rotation about its longitudinal axis, said bearing means including a spherical surface on and along the longitudinal axis of said shaft and a conical well mounted on said frame for receiving said spherical surface, said conical well being longitudinally movable within said frame for longitudinally moving said shaft, further bearing means spaced from the other end of said shaft including a bearing ring mounted within said frame and a conical bearing surface on said shaft engaged against said bearing ring, a flywheel rigidly mounted on said shaft between said bearing means, and a turntable rigidly mounted on said shaft at said other end.

3. A phonograph turntable mounting assembly comprising a frame, a main shaft, bearing means mounted in said frame for supporting one end of said shaft for rotation about its longitudinal axis, said bearing means being longitudinally movable within said frame for longitudinally moving said shaft, further bearing means spaced from the other end of said shaft including a bearing ring mounted within said frame and a conical bearing surface on said shaft engaged against said bearing ring, a flywheel rigidly mounted on said shaft between said bearing means, a turntable rigidly mounted on said shaft at said other end, a motor mounted on said frame and means interconnecting said motor and one of said flywheel shaft and turntable to rotate same.

4. A phonograph turntable mounting assembly comprising a frame, a main shaft, bearing means mounted in said frame for supporting one end of said shaft for rotation about its longitudinal axis, said bearing means including a spherical surface on and along the longitudinal axis of said shaft and a conical well mounted on said frame for receiving said spherical surface, said conical well being longitudinally movable within said frame for longitudinally moving said shaft, further bearing means spaced from the other end of said shaft including a resilient bearing ring mounted within said frame and a conical bearing surface on said shaft engaged against said bearing ring, a flywheel rigidly mounted on said shaft between said bearing means, a turntable rigidly mounted on said shaft at said other end, a motor having a drive shaft resiliently mounted on said frame and means interconnecting said drive shaft and said flywheel to rotate said flywheel, shaft and turntable.

5. A phonograph turntable comprising a frame, an elongated rotating member, first and second spaced bearings mounting said member for rotation within said frame, a flywheel rigidly secured to said member intermediate said first and second bearings, and a turntable platter operatively secured to said rotating member and separated from said flywheel by one of said bearings, said first bearing including a conical well and a conical bearing section received within said well, said second bearing including an annular resilient ring and a coacting surface of rotation engaged with said ring as a bearing surface.

6. A phonograph turntable mounting assembly comprising a frame, a rotating member mounted within said frame, a first bearing at one end of said member including a sperical surface on said end of the member and a bearing plug having a concave well formed therein receiving said end of said member, a second, self-centering bearing adjacent the other end of said member including a conical section on said member and a mating, annular bearing member mounted rigidly within said frame and coaxial with the central axis of said member, and adjustment means mounting said bearing plug within said frame for selective axial movement toward and away from said second bearing.

7. A phonograph turntable mounting assembly comprising a frame, a main rotating shaft, bearing means mounted in said frame for supporting one end of said shaft for rotation about its longitudinal axis, said bearing means including a spherical surface on and along the longitudinal axis of said shaft and a conical well mounted on said frame for receiving said spherical surface, said conical well being longitudinally movable within said frame for longitudinally moving said shaft, further bearing means spaced from the other end of said shaft including a resilient bearing ring mounted within said frame and a conical bearing surface on said shaft engaged against said bearing ring, a turntable rigidly mounted on said shaft at said other end, and a member of relatively high weight secured to said shaft between said bearing means providing a flywheel effect for said main rotating shaft.

8. A phonograph turntable assembly comprising a frame, a main shaft, a flywheel fixed to said shaft, first and second bearing means mounting said shaft within said frame for rotation, and a turntable platter operatively connected to said shaft and separated from said flywheel by one of said bearings, said first bearing including a generally conical section on the lower end of said shaft and a substantially conical bearing well receiving said conical section and mounted in said frame, said second bearing means including an annular resilient bearing member mounted within said frame and engaged against a substantially cylindrical portion of said shaft, said first and second bearing means providing zero clearance mounting for said shaft.

9. A phonograph turntable assembly comprising a frame, a main shaft, a flywheel fixed to said shaft, first and second bearing means mounting said shaft within said frame for rotation, and a turntable platter operatively connected to said shaft and separated from said flywheel by one of said bearings, said first bearing including a spherical tip on the lower end of said shaft and a substantially conical bearing well receiving said tip and mounted in said frame, said second bearing means including an annular resilient bearing member mounted within said frame and engaged against a substantially cylindrical portion of said shaft, said first and second bearing means providing zero clearance mounting for said shaft.

10. A phonograph turntable mounting assembly comprising a frame, a main shaft, bearing means mounted in said frame for supporting one end of said shaft, said bearing means being longitudinally movable within said frame for longitudinally moving said shaft, further bearing means spaced from the other end of said shaft mounting said shaft for rotation in said frame, said further bearing means including a bearing ring and a cooperating conical bearing surface, a flywheel rigidly mounted on said shaft between said bearing means, and a turntable rigidly mounted on said shaft at said other end.

11. A phonograph turntable mounting assembly comprising a frame, a main shaft, a pair of bearing means mounting said shaft at spaced points within said frame for rotation therein, one of said bearing means being movable with respect to the other for longitudinally moving said shaft, the first of said pair of bearing means located at and supporting one end of said shaft, the second of said pair of bearing means spaced from the other end of said shaft and including a conical bearing surface and a cooperating bearing ring, a flywheel rigidly mounted on said shaft between said bearing means, and a turntable rigidly mounted on said shaft at said other end.

12. A phonograph turntable mounting assembly comprising a frame, a main shaft, a pair of bearing means mounting said shaft at spaced points within said frame for rotation therein, one of said bearing means being movable with respect to the other for longitudinally moving said shaft, the first of said pair of bearing means located at and supporting one end of said shaft, the second of said pair of bearing means spaced from the other end of said shaft and including a conical bearing surface on said shaft and a cooperating bearing ring supported in said frame, a flywheel rigidly mounted on said shaft between said bearing means, and a turntable rigidly mounted on said shaft at said other end.

13. A phonograph turntable mounting assembly comprising a frame, a main shaft, bearing means mounted in said frame for supporting one end of said shaft, said bearing means being longitudinally movable within said frame for longitudinally moving said shaft, further bearing means spaced from the other end of said shaft including a bearing ring mounted within said frame and a conical bearing surface on said shaft engaged against said bearing ring, and a turntable rigidly mounted on said shaft at said other end.

14. A phonograph turntable mounting assembly comprising a frame, a main shaft, bearing means mounted in said frame for supporting one end of said shaft, said bearing means being longitudinally movable within said frame for longitudinally moving said shaft, further bearing means spaced from the other end of said shaft mounting said shaft for rotation in said frame, said further bearing means including a bearing ring and a cooperating conical bearing surface, and a turntable rigidly mounted on said shaft at said other end.

15. A phonograph turntable mounting assembly comprising a frame, a main shaft, a pair of bearing means mounting said shaft at spaced points within said frame for rotation therein, one of said bearing means being movable with respect to the other for longitudinally moving said shaft, the first of said pair of bearing means located at and supporting one end of said shaft, the second of said pair of bearing means spaced from the other end of said shaft and including a conical bearing surface and a cooperating bearing ring, and a turntable rigidly mounted on said shaft at said other end.

16. A phonograph turntable comprising a frame, an elongated rotating member, first and second spaced bearings mounting said member for rotation within said frame, a flywheel rigidly secured to said member intermediate said first and second bearings, a turntable platter operatively secured to said rotating member and separated from said flywheel by one of said bearings, said first bearing including a substantially conical well and a bearing member received within said well, said second bearing including a conical bearing surface and a cooperating bearing ring, and means adjustably mounting one of said bearings in said frame for movement of said one bearing toward the other for adjusting the bearing clearance of said phonograph turntable.

References Cited in the file of this patent

UNITED STATES PATENTS

| | | |
|---|---|---|
| 2,106,718 | Carson et al. | Feb. 1, 1938 |
| 2,139,113 | Cline et al. | Dec. 6, 1938 |
| 2,244,506 | Staszkiewiecz | June 3, 1941 |
| 2,296,798 | Reid | Sept. 22, 1942 |
| 2,544,166 | Limberger | Mar. 6, 1951 |
| 2,673,089 | Osborne | Mar. 23, 1954 |
| 2,766,080 | Fineran | Oct. 9, 1956 |
| 2,976,088 | Contant | Mar. 21, 1961 |